(12) United States Patent
Hartranft et al.

(10) Patent No.: US 8,997,359 B2
(45) Date of Patent: Apr. 7, 2015

(54) HANDHELD CABLE CUTTER WITH STABILIZING BASE

(75) Inventors: Bruce W. Hartranft, St. Charles, IL (US); Bruce P. Konen, Shenzhen (CN)

(73) Assignee: IDEAL Industries, Inc., Sycamore, IL (US)

( * ) Notice: Subject to any disclaimer, the term of this patent is extended or adjusted under 35 U.S.C. 154(b) by 190 days.

(21) Appl. No.: 12/204,111

(22) Filed: Sep. 4, 2008

(65) Prior Publication Data
US 2009/0071013 A1 Mar. 19, 2009

Related U.S. Application Data

(60) Provisional application No. 60/970,717, filed on Sep. 7, 2007.

(51) Int. Cl.
*B26B 13/00* (2006.01)
*H02G 1/00* (2006.01)

(52) U.S. Cl.
CPC ..................................... *H02G 1/005* (2013.01)

(58) Field of Classification Search
USPC ........... 30/251, 252, 250, 244, 341, 342, 340, 30/131, 132, 134, 135, 185, 196; D8/306, D8/55, 5; 16/DIG. 12; 7/168; 81/358, 342, 81/340
See application file for complete search history.

(56) References Cited

U.S. PATENT DOCUMENTS

| 295,718 | A | * | 3/1884 | Bayrer | 30/250 |
|---|---|---|---|---|---|
| 2,520,905 | A | * | 9/1950 | Borrelli | 30/237 |
| 3,572,192 | A | * | 3/1971 | Foye | 81/383.5 |
| 4,178,682 | A | * | 12/1979 | Sadauskas | 30/250 |
| 4,341,016 | A | * | 7/1982 | Harrison et al. | 30/262 |
| 4,644,650 | A | * | 2/1987 | Laux et al. | 30/250 |
| D289,250 | S | * | 4/1987 | Pittaway | D8/5 |
| 4,768,254 | A | * | 9/1988 | Bell | 15/236.01 |
| 4,899,445 | A | * | 2/1990 | Erbrick et al. | 30/251 |
| 5,184,404 | A | * | 2/1993 | Chen | 30/250 |
| 5,231,763 | A | * | 8/1993 | Laux | 30/250 |
| 5,307,565 | A | * | 5/1994 | Erbrick et al. | 30/251 |
| 5,709,030 | A | * | 1/1998 | Wang | 30/251 |
| 6,334,255 | B1 | * | 1/2002 | Chang | 30/252 |
| 6,513,245 | B1 | * | 2/2003 | Aubriot | 30/92 |
| 6,523,266 | B2 | * | 2/2003 | Yang | 30/252 |
| D502,068 | S | * | 2/2005 | Tatic | D8/5 |
| 6,860,018 | B2 | * | 3/2005 | Schneider et al. | 30/262 |
| 7,047,853 | B2 | * | 5/2006 | Brockhage | 83/56 |
| 7,080,453 | B2 | * | 7/2006 | Laux | 30/92 |
| 7,454,837 | B2 | * | 11/2008 | Shan | 30/254 |
| 7,640,666 | B1 | * | 1/2010 | Huang | 30/234 |
| 7,654,005 | B2 | * | 2/2010 | Perrin | 30/194 |

* cited by examiner

*Primary Examiner* — Omar Flores Sanchez
(74) *Attorney, Agent, or Firm* — Greenberg Traurig, LLP

(57) ABSTRACT

A handheld cable cutter is provided with two handles, a stationary cutting blade, and a rotatable cutting blade pivotally connected to the stationary cutting blade. One of the handles is movable such that movement of the movable handle toward and away from the other, stationary handle drives the rotatable cutting blade toward the stationary cutting blade. The stationary handle includes an enlarged, integral stabilizing base which rests upon a support surface when the movable handle is actuated to cut a cable.

7 Claims, 1 Drawing Sheet

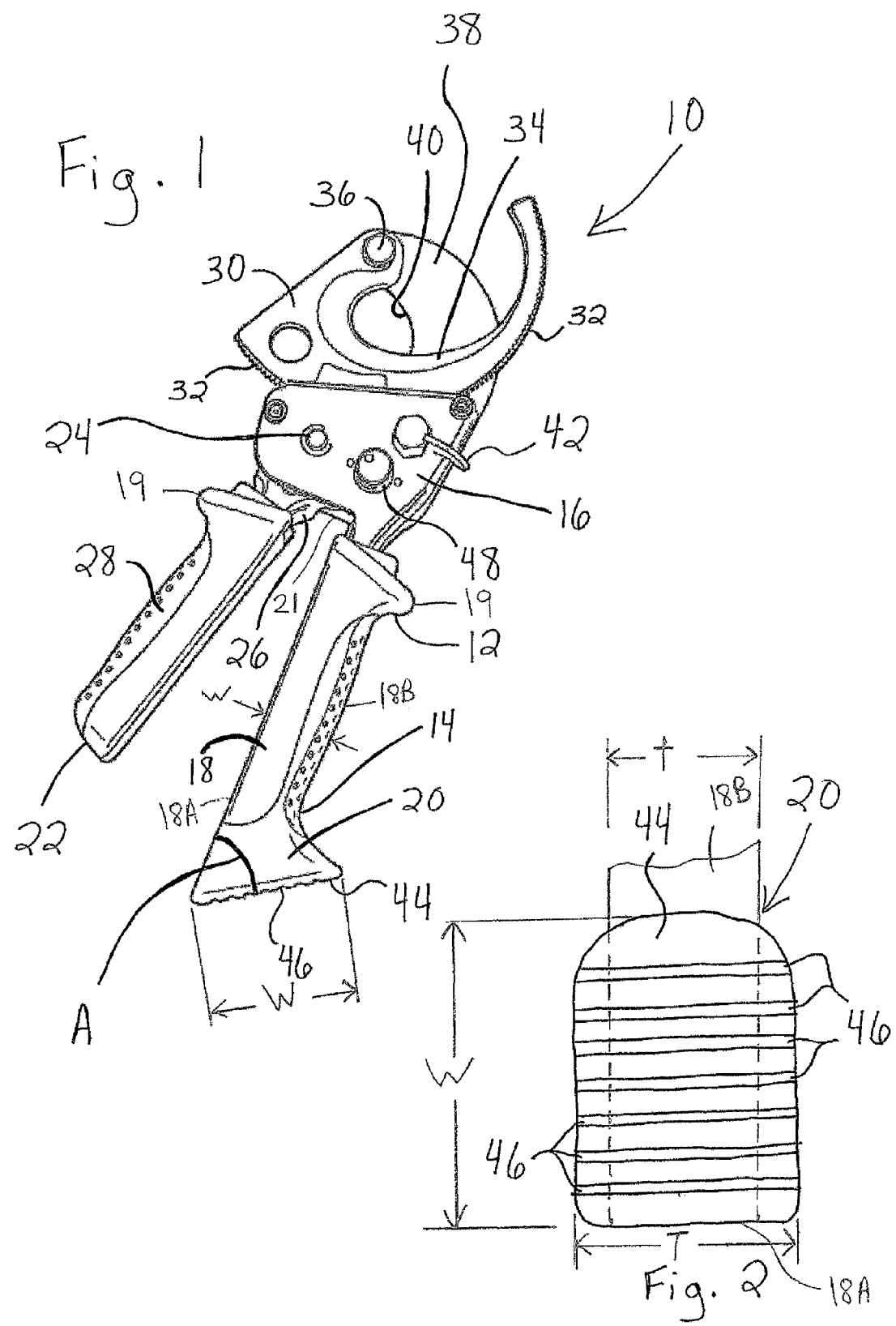

HANDHELD CABLE CUTTER WITH STABILIZING BASE

CROSS REFERENCE TO RELATED APPLICATION

This application claims the benefit of U.S. Provisional Application No. 60/970,717 filed Sep. 7, 2007, the disclosure of which is hereby incorporated herein by reference.

BACKGROUND

The present invention relates to cable cutters and, in particular, to a handheld cable cutter having a stabilizing base engageable with a support surface during use.

Cable cutters are used to cut large electrical cables of the type used in high voltage or high current applications. Such cables can vary in diameter but generally they can be an inch in diameter or larger. Power tools or devices actuated by power tools, such as handheld drills, have been provided for cutting through larger cables. One such tool is shown in U.S. Pat. No. 7,293,362 to Konen, which is hereby incorporated herein by reference.

Hand tools are also known for cutting smaller cables. Typically, such handheld devices incorporate a ratchet feature which is repeatedly actuated by squeezing together two levers or handles to slowly force a cutting blade through a cable. One such handheld cable cutter is shown in U.S. Pat. No. 6,766,581 to Nordlin, which is hereby incorporated herein.

Although handheld cable cutters are typically intended for use in cutting smaller cables, there are times when they are used in cutting larger cables. To apply sufficient force to cut larger cables, it may be necessary for the user to squeeze the handles with two hands. This requires the user to remove his/her hand from the cable, which can allow the cable to move, possibly resulting in an unacceptable cut.

One product which avoids this disadvantage is the Telco Ratcheting Cable Cutter from IDEAL Industries, Inc. of Sycamore, Ill. The Telco Ratcheting Cable Cutter has two handles, one of which is movable toward the other to actuate a ratchet. The ratchet engages gear teeth of a rotatable blade, whereby actuation of the ratchet advances the rotatable blade toward a stationary blade. When it is required to apply a heightened amount of cutting force, the free end of the stationary handle is placed into the cavity of a high-leverage foot attachment. The high-leverage foot attachment is rested on a flat support surface while the movable handle is pressed to advance the rotatable blade. The high-leverage foot attachment holds the stationary handle in place while the movable handle is actuated, thereby allowing the user to keep one hand on the cable while pressing the movable handle toward the stationary handle. Alternatively, rather than keeping one hand on the cable, the user may use both hands to press the movable handle toward the stationary handle. Both of these methods typically allow for a greater cutting force than can be achieved by placing one hand on each handle and squeezing them together.

However, while the high-leverage foot attachment improves the operation of the Telco Ratcheting Cable Cutter, it may have some disadvantages as well. In particular, the cavity of the high-leverage foot attachment must be precisely matched to the free end of the stationary handle, otherwise the cable cutter can shift position within the cavity, hindering the cutting process. Further, there is the possibility that the free end of the stationary handle may slip out of the cavity of the high-leverage foot attachment, also hindering the cutting process.

Therefore, a need remains for a handheld cable cutter that provides for improved performance in operations requiring the application of additional cutting force, while adding to the stability of the cable cutter.

SUMMARY

In accordance with one embodiment or aspect of the present invention, a handheld cable cutter is provided with two handles, a stationary cutting blade, and a rotatable cutting blade pivotally connected to the stationary cutting blade. One of the handles is movable such that movement of the movable handle toward and away from the other, stationary handle drives the rotatable cutting blade toward the stationary cutting blade. The stationary handle includes an enlarged, integral stationary base which rests upon a support surface when the movable handle is actuated to cut a cable.

BRIEF DESCRIPTION OF THE DRAWINGS

FIG. 1 is a front perspective view of a handheld cable cutter according to an aspect of the present invention.

FIG. 2 is a bottom plan view, on an enlarged scale compared to FIG. 1, of a stationary handle of the handheld cable cutter of FIG. 1, looking at the bottom surface of the stabilizing base.

DETAILED DESCRIPTION

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

FIG. 1 illustrates a handheld cable cutter 10 according to an aspect of the present invention. The cable cutter 10 is comprised of a stationary handle 12 extending from a free end 14 to a body portion 16 at the other end. In one embodiment, the stationary handle 12 is comprised of a metallic material, typically steel, with the body portion 16 being exposed and an elongated steel shank portion covered by a grip or sleeve 18. The grip may include a soft, elastomeric overmold. The overmold may comprise one or more layers of elastomeric materials such as, but not limited to, Santoprene® from Advanced Elastomer Systems, L.P. of Akron, Ohio, and/or polypropylene. The grip 18 has an inside edge 18A and an outside edge 18B, with a width w defined by these two edges. The upper end of the grip near the body portion has an enlarged collar 19. The collar extends around three sides of the grip and provides a stop that prevents a user's fingers or palm from slipping off the top of the grip. The free end 14 of the stationary handle 12 includes an integrated stabilizing base 20 which will be described in greater detail below.

The body portion 16 overlies a similarly shaped back plate, a small portion of which is visible at 21. The back plate is fastened to the body portion by bolts 23. Spacers (not shown) are located between the body portion and back plate to define a channel between them.

A movable handle 22 is pivotally connected to the body portion 16 by pivot pin 24, allowing the movable handle 22 to be pivoted toward and away from the stationary handle 12. The movable handle 22 may be biased away from the stationary handle 12 by a spring (not shown), according to known design. Typically, the movable handle 22 has an exposed metal head portion 26 pinned to the body portion 16 and an elongated portion covered by a sleeve 28. The sleeve may have a soft elastomeric overmold. An upper end of the head portion 26 includes a ratchet (not shown) adapted for reciprocating movement in the open channel between the body portion 16 and the back plate 21.

Also movable through the channel is a rotatable blade 30. The rotatable blade 30 is provided according to known design, essentially comprising a segment gear with a plurality of gear teeth 32 and a cutting edge 34. The gear teeth 32 are engageable with the ratchet of the movable handle 22, such that squeezing the handles together will cause the ratchet to advance the gear teeth 32 (and hence the rotatable blade 30) through the channel.

The rotatable blade 30 is pivotally connected at pivot pin 36 to a stationary blade 38. The stationary blade 38 includes a cutting edge 40 in facing relationship to the cutting edge 34 of the rotatable blade 30. In one embodiment, the stationary blade 38 is an upper portion of the back plate 21. The stationary blade imparts a generally C-shape to the back plate 21. As mentioned above, the back plate is secured to the back face of the body portion 16 of the stationary handle 12. By such a configuration, the C-shaped plate 21 cooperates with the body portion 16 to define the channel.

In a first operational mode, a cable is placed between the cutting blades and the handles are squeezed together repeatedly. Each squeeze actuates the ratchet, thereby partially moving the rotatable blade 30 through the channel toward the stationary blade 38 (i.e., in a counterclockwise direction in the orientation of FIG. 1). A locking member (not shown) extends into the channel to engage the gear teeth 32 downstream of the ratchet (i.e., to the right of the ratchet in the illustrated orientation). The ratchet moves rearwardly on the backstroke of the movable handle 22, so the locking member engages the gear teeth 32 to prevent them and the rotatable blade 30 from moving away from the stationary blade 12 with the ratchet. In the illustrated embodiment, the locking member extends from a handle release mechanism 42, which is a knob that can be rotated to move the locking member out of the channel, allowing the rotatable blade 30 to be manually retracted from (or advanced through) the channel.

Continuing to repeatedly squeeze the handles together advances the rotatable blade 30 toward the stationary blade 38, thereby severing a cable held between the blades. When the cable has been cut, the rotatable blade 30 may be fully advanced through the channel and thereafter pivoted counterclockwise to return it to a start position in which it is ready to cut another cable. Alternatively, the handle release mechanism 42 may be rotated to disengage the locking member from the gear teeth 32, allowing the rotatable blade 30 to be rotated clockwise to a start position.

While the foregoing method is suitable for smaller cables, a second mode capable of a greater cutting force may be required for larger cables. To that end, the free end 14 of the stationary handle 12 is provided with a stabilizing base 20 to rest on a support surface (not shown). Advantageously, the stabilizing base 20 is integrally formed with the grip portion 18 of the stationary handle 12. According to the foregoing description, the grip portion 18 covers a metal shank. The stabilizing base 20 may be a solid extension of the polymeric material of the grip portion. Alternatively, the stabilizing base 20 may be made of an exposed or covered metallic material. The length of the stationary handle 12 is such that the stabilizing base 20 is separated from the collar 19 by a distance sufficient to permit a user's hand to comfortably fit between the collar and the base. That is, whether the user grasps the stationary handle with the palm of his or her hand or with his or her fingers, there is sufficient space between the collar 19 and base 20 to accommodate the user's hand.

The stabilizing base 20 has a footprint (shown in greater detail in FIG. 2) which is substantially larger than the central cross-section of the grip portion 18. For example, in the illustrated embodiment, the stabilizing base 20 is smoothly tapered away from the grip portion 18 to have a thickness T approximately 50% larger than thickness t of the central part of the grip portion 18 and a width W approximately twice as large as width w (FIG. 1) of the grip portion 18. Such a size is merely exemplary and differently sized stabilizing bases may also be employed without departing from the scope of the present invention. Also, in this embodiment the width of the stabilizing base tapers outwardly only from the outside edge 18B of the grip; the inside edge 18A is straight. In the thickness direction, the stabilizing base 20 tapers from both the front and rear faces of the grip, as indicated by the dashed lines in FIG. 2. Taken together, the stabilizing base tapers outwardly on three sides of the grip 18.

The illustrated stabilizing base 20 is also shown with a bottom surface 44 having a plurality of ridges 46. The ridges 46 affect the friction between the stabilizing base 20 and the support surface and may be provided in different, non-parallel patterns to provide different friction profiles. In other embodiments, the bottom surface 44 of the stabilizing base 20 may be otherwise textured or substantially planar (i.e., without ridges or texture) to provide other friction profiles.

The bottom surface 44 of the stabilizing base 20 is configured such that the stationary handle 12 will extend away from a support surface at a pre-selected angle. In the illustrated embodiment, the angle "A" between the bottom surface 44 of the stabilizing base 20 and the inside edge 18A of the grip portion 18 of the stationary handle 12 is approximately 60°. The angle "A" may vary, depending on the material composition and orientation of the various components and the overall balance of the cable cutter 10. Typically, the angle is selected such that the cable cutter will be well-balanced and stable when in use during a second operational mode, which will now be described in greater detail.

In a second operational mode, which may be advantageous for use in cutting larger cables, a cable is placed between the cutting blades. The bottom surface 44 of the stabilizing base 20 is placed on a support surface. Typically, the support surface is a flat, horizontal surface, such as a tabletop or floor. With the stationary handle 12 thus supported by the support surface, the movable handle 22 may be actuated by the user to cut the cable. The movable handle 22 may be operated with one or two hands (or a foot or other leverage applicator as may be required) to provide greater cutting force than is typically possible in the previously described first operational mode. It will be appreciated by those of ordinary skill in the art that the second operational mode relies in part on the cable cutter 10 remaining stationary while the movable handle 22 is actuated. Hence, the second operational mode is made possible by the stabilizing base 20, which prevents the cable cutter 10 from moving, shifting, or rocking during use.

Other features may also be incorporated into cable cutters according to the present invention. For example, FIG. 1 illustrates an embodiment including a handle locking mechanism 48, which is a knob that may be used to lock the movable handle 22 in a position directly adjacent to the stationary handle 12 for storage.

It will be understood that the embodiments of the present invention which have been described are illustrative of some of the applications of the principles of the present invention. Numerous modifications may be made by those skilled in the art without departing from the true spirit and scope of the invention, including those combinations of features that are individually disclosed or claimed herein. For example, while the handles are shown having elongated steel shanks covered by a separate grip portion, this two-part construction is not required. Each handle could have a unitary construction.

We claim:

1. A cable cutting tool operable in conjunction with a support surface, the cable cutting tool comprising:
   a stationary cutting blade;
   a rotatable cutting blade pivotally connected to the stationary cutting blade;
   a stationary handle having a body portion connected at one end of the stationary handle to the stationary cutting blade, the body portion having a width (w), which defines a perpendicular bisector thereof and a thickness (t) orthogonal to the width (w);
   a pivot pin mounted on the body portion;
   a movable handle pivotally connected at one end to the pivot pin for reciprocating movement toward and away from the stationary handle, the movable handle being engageable with the rotatable cutting blade such that movement of the movable handle toward the stationary handle will advance the rotatable cutting blade toward the stationary cutting blade, the movable handle also having a free end opposite the one end that is connected to the pivot pin;
   an integral stabilizing base formed on the other end of the stationary handle and including a substantially flat bottom surface which extends from the stationary handle at an acute angle the stabilizing base having a width (W) which defines a perpendicular bisector thereof and a thickness (T) orthogonal to the width (W), the pivot pin and free end of the movable handle being located on opposite sides of the perpendicular bisector of the stabilizing base,
   wherein the width (W) of the stabilizing base is approximately twice as large as the width (w) of the stationary handle, and the thickness (T) of the stabilizing base is approximately 50% larger than thickness (t) of the stationary handle; and
   wherein when the bottom surface of the stabilizing base of the stationary handle is placed on a horizontal surface, the bottom surface substantially prevents the cable cutting tool from moving relative to the surface while the movable handle is pivoted toward the stationary handle to apply a cutting force.

2. The cable cutting tool of claim 1 wherein the stabilizing base includes a friction profile on the bottom surface adapted for non-slipping engagement with the support surface.

3. The cable cutting tool of claim 2 wherein the friction profile comprises a plurality of ridges.

4. The cable cutting tool of claim 1 wherein the stationary handle has an inside edge and an outside edge, the inside edge extending straight to the stabilizing base and while the outside edge is tapered to the stabilizing base.

5. The cable cutting tool of claim 1 wherein the angle is approximately 60 degrees.

6. The cable cutting tool of claim 1 wherein the stationary handle further includes a collar which is separated from the stabilizing base a distance sufficient to permit a user to grasp the stationary handle between the collar and the stabilizing base.

7. The cable cutting tool of claim 1 wherein the stationary handle includes an elongated shank portion tapering at a free end to the stabilizing base.

* * * * *